US012785209B2

(12) United States Patent
Grass et al.

(10) Patent No.: US 12,785,209 B2

(45) Date of Patent: Nov. 3, 2026

(54) BATTERY MODULE FOR MOTOR VEHICLE

(71) Applicant: Dr. Ing. h.c. F. Porsche Aktiengesellschaft, Stuttgart (DE)

(72) Inventors: Dominik Grass, Bietigheim-Bissingen (DE); Oliver Steiner, Lehrensteinsfeld (DE); Tim Schmidt, Freiberg am Neckar (DE); Markus Göhring, Nufringen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 549 days.

(21) Appl. No.: 18/370,437

(22) Filed: Sep. 20, 2023

(65) Prior Publication Data

US 2024/0097269 A1 Mar. 21, 2024

(30) Foreign Application Priority Data

Sep. 21, 2022 (DE) ..................... 10 2022 124 281.1

(51) Int. Cl.

| | |
|---|---|
| ***H01M 50/358*** | (2021.01) |
| ***H01M 10/625*** | (2014.01) |
| ***H01M 10/6566*** | (2014.01) |
| ***H01M 50/184*** | (2021.01) |
| *B60L 50/64* | (2019.01) |

(Continued)

(52) U.S. Cl.

CPC ....... *H01M 50/358* (2021.01); *H01M 10/625* (2015.04); *H01M 10/6566* (2015.04); *H01M 50/184* (2021.01); *B60L 50/64* (2019.02); *H01M 10/613* (2015.04); *H01M 10/6556* (2015.04); *H01M 10/658* (2015.04); *H01M 50/204* (2021.01); *H01M 50/249* (2021.01); *H01M 50/30* (2021.01); *Y02E 60/10* (2013.01)

(58) Field of Classification Search

CPC ... B60L 50/64; H01M 10/613; H01M 10/625; H01M 10/6556; H01M 10/6566; H01M 10/658; H01M 50/184; H01M 50/204; H01M 50/249; H01M 50/30; H01M 50/358; Y02E 60/10

See application file for complete search history.

(56) References Cited

U.S. PATENT DOCUMENTS

| | | | |
|---|---|---|---|
| 10,593,921 | B2 | 3/2020 | Page et al. |
| 2010/0193910 | A1 | 8/2010 | Kishino et al. |

(Continued)

FOREIGN PATENT DOCUMENTS

| | | | |
|---|---|---|---|
| CN | 107146897 | A | 9/2017 |
| CN | 111162218 | A | 5/2020 |

(Continued)

OTHER PUBLICATIONS

Great Britain Combined Search and Examination Report for Application No. GB2314431.4, dated Feb. 19, 2024, 3 pages.

*Primary Examiner* — Lingwen R Zeng

(74) *Attorney, Agent, or Firm* — Buchanan Ingersoll & Rooney PC

(57) ABSTRACT

A module for a battery includes a housing traversed by passages for coolant, cells arranged between the passages, and sealing bodies arranged in the passages. The sealing bodies expand upon heating and partially close the passages. The sealing bodies are aligned with walls of the housing to contact the walls upon expansion of the sealing bodies and thereby form a boundary around the cell.

19 Claims, 3 Drawing Sheets

(51) Int. Cl.

| | |
|---|---|
| *H01M 10/613* | (2014.01) |
| *H01M 10/6556* | (2014.01) |
| *H01M 10/658* | (2014.01) |
| *H01M 50/204* | (2021.01) |
| *H01M 50/249* | (2021.01) |
| *H01M 50/30* | (2021.01) |

(56) References Cited

U.S. PATENT DOCUMENTS

| | | | | |
|---|---|---|---|---|
| 2021/0083344 | A1 | 3/2021 | Min | |
| 2021/0320374 | A1 | 10/2021 | Lee et al. | |
| 2022/0029222 | A1* | 1/2022 | Lee | H01M 50/516 |
| 2022/0115737 | A1 | 4/2022 | Shin et al. | |
| 2022/0271359 | A1 | 8/2022 | Franke | |
| 2022/0271387 | A1 | 8/2022 | Shin et al. | |
| 2023/0136430 | A1* | 5/2023 | Palmer | H01M 50/24 429/100 |
| 2023/0395955 | A1 | 12/2023 | Lee et al. | |

FOREIGN PATENT DOCUMENTS

| | | | |
|---|---|---|---|
| CN | 114424394 | A | 4/2022 |
| CN | 116780056 | A | 9/2023 |
| DE | 1020140080000 | A1 | 11/2015 |
| DE | 102021103378 | B3 | 1/2022 |
| EP | 3493293 | A1 | 6/2019 |
| JP | 2017182898 | A | 10/2017 |
| JP | 6991839 | B2 | 1/2022 |
| WO | 2018062172 | A1 | 4/2018 |

* cited by examiner

BATTERY MODULE FOR MOTOR VEHICLE

CROSS-REFERENCE TO RELATED APPLICATION

This application claims priority to German Patent Application No. 10 2022 124 281.1, filed Sep. 21, 2022, the content of such application being incorporated by reference herein in its entirety.

FIELD OF THE INVENTION

The present invention relates to a module for a battery. The present invention further relates to its use, a corresponding battery, as well as a motor vehicle.

BACKGROUND OF THE INVENTION

If a short-circuit occurs in a lithium-ion battery with liquid, solid, or bonded electrolytes, for example due to contamination of the separator by a foreign particle included or mechanical damage, the short-circuit current through the internal resistor can heat up the surrounding environment of the damaged area such that the surrounding regions are also impaired. This process expands and releases the energy stored in the accumulator in a short time. Such an incident is known in technical chemistry and methods engineering as thermal runaway.

US2010183910AA, which is incorporated by reference herein, relates to a battery pack in which round cells in a rectangular housing are surrounded by thermally expanding material, wherein an abnormally hot cell can be thermally insulated, in that gaps are sealed. A cell is a multi-layered or wound cylinder.

DE10202110337863, which is incorporated by reference herein, discloses and claims a traction battery with a degassing collector, wherein a degassing chamber and a battery pack that can be displaced thereto are contained. In the degassing chamber, for example, a material that foams up due to the heat of hot gas, e.g. an anti-heat protective lacquer, is configured in order to separate overheating-prone regions of the degassing chamber. The material is intended to close an opening with a delay in order to prevent overheating after too long of a heat exposure.

U.S. Ser. No. 10/593,921BB, which is incorporated by reference herein, discloses and claims a battery housing for cylindrical batteries in which an intumescent (i.e. non-chemically expanding) flame-retardant material is arranged such that, in the event of a thermal runaway, a gas is discharged from the battery-accommodating chamber through a ventilation passage along with a powder stored in this region.

DE102014008000A1, which is incorporated by reference herein, discloses and claims an accumulator apparatus having a laminar fire protection element. In one example, it is mentioned that the insulation layer comprises intumescent material between the individual galvanic cells, such that, in the event of a fire, a distance between the individual galvanic cells is increased. In this case, leakage of gases produced in the galvanic cell in an exiting direction is not to be hindered.

JP2017182898A2, which is incorporated by reference herein, discloses and claims a battery with improved combustion-resistant performance. An air passage between multiple battery modules is closed with a material that expands upon heating in order to prevent the penetration of heat into an involved ventilation passage.

EP3493293B1, which is incorporated by reference herein, discloses and claims a housing for batteries, for example, in which a double-ply insulating panel with a thermally activatable material is arranged such that a breakthrough, e.g. for a fluid line or cable, is closed (intumescently) in the event of heat or fire.

JP6991839B2, which is incorporated by reference herein, discloses and claims a battery insulating structure in which graphite material that expands under the effects of heat forms a cushion effect and protection against flames and heat.

CN111162218A, which is incorporated by reference herein, relates to a battery pack having a buffer and heat-insulating layer between the active layers.

US2022115737AA, which is incorporated by reference herein, discloses and claims a battery pack in which a flame-inhibiting plate having a thermally expanding layer is provided, so that a battery pack is compressed and the fire cannot propagate within the pack.

CN114424394A, which is incorporated by reference herein, discloses and claims a battery pack with improved safety against fire or thermal runaway. A sealing means is provided, which expands from a specified temperature in order to thus close an end-side grid and prevent (hot) ambient air from flowing into the battery pack.

SUMMARY OF THE INVENTION

One advantage of the battery module described herein lies in the creation of an anti-propagation protection or system that separates an overheated cell from the remaining intact cells. As a result, the hot gas does not flow past the intact cells, or no cooling medium flows from the remaining intact battery module into the region of the defective cells.

For this purpose, in certain regions within the battery or module, sealing bodies are attached which rapidly expand greatly in the event of heat effects, thereby blocking or sealing off flow passages. This material could be attached to housings, cells, cooling plates, compression pads or to other parts of the module or cell stack.

The regions or passages in which this material is attached should be open in the normal state, for example because they form a flow passage for a cooling medium.

Further advantageous configurations of the invention are specified in the dependent claims. For example, the sealing bodies can be arranged such that, in pairs, they divide the passages into sections extending along the cells, which open into a respective degassing opening of the housing. In these regions between adjacent sealing bodies, the sealing material is deliberately not attached, in order to provide a degassing path for the hot gas to exit from the cell through the module or battery housing in the event of a fire.

Thus, flow passages can be utilized for cooling (e.g., direct cooling) of the cells in normal operation, which then close upon impending discharge of hot gases out of the cell.

As a result, the passages connecting the cells or modules to one another, which are normally open, can be closed, and a still open region or passage from the respective degassing cell to the next possible degassing opening in the battery or module housing can be created without hot gases flowing past other, still intact cells. Thus, the still intact cells are not heated or damaged by the escaping gas, and cell propagation is prevented.

This system can additionally be used in specially designed constrictions in the cooling passage region, e.g. between modules or cell stacks. Thus, different regions can be created, some with multiple cells, which are however partitioned from one another in the event of a thermal runaway. Stack-to-stack propagation is thus inhibited.

It can further be provided that the passages are connected in a network such that, when one of their sections is closed, the flow of coolant does not run away beyond the adjacent sealing bodies. Thus, in case of a thermal runaway, as the hot gas and cooling medium in the now partitioned region of the involved cell escape through the degassing openings in the housing, the remaining cooling medium in the module is separated from the hot gases by the swollen material and does not escape through the degassing opening. Rather, the remaining cooling medium in the module continues to be circulated as before, cools the surrounding cells, and also counteracts cell propagation.

BRIEF DESCRIPTION OF THE DRAWINGS

An embodiment example of the invention is shown in the drawings and is described in further detail below.

DETAILED DESCRIPTION OF THE INVENTION

Figure 1:
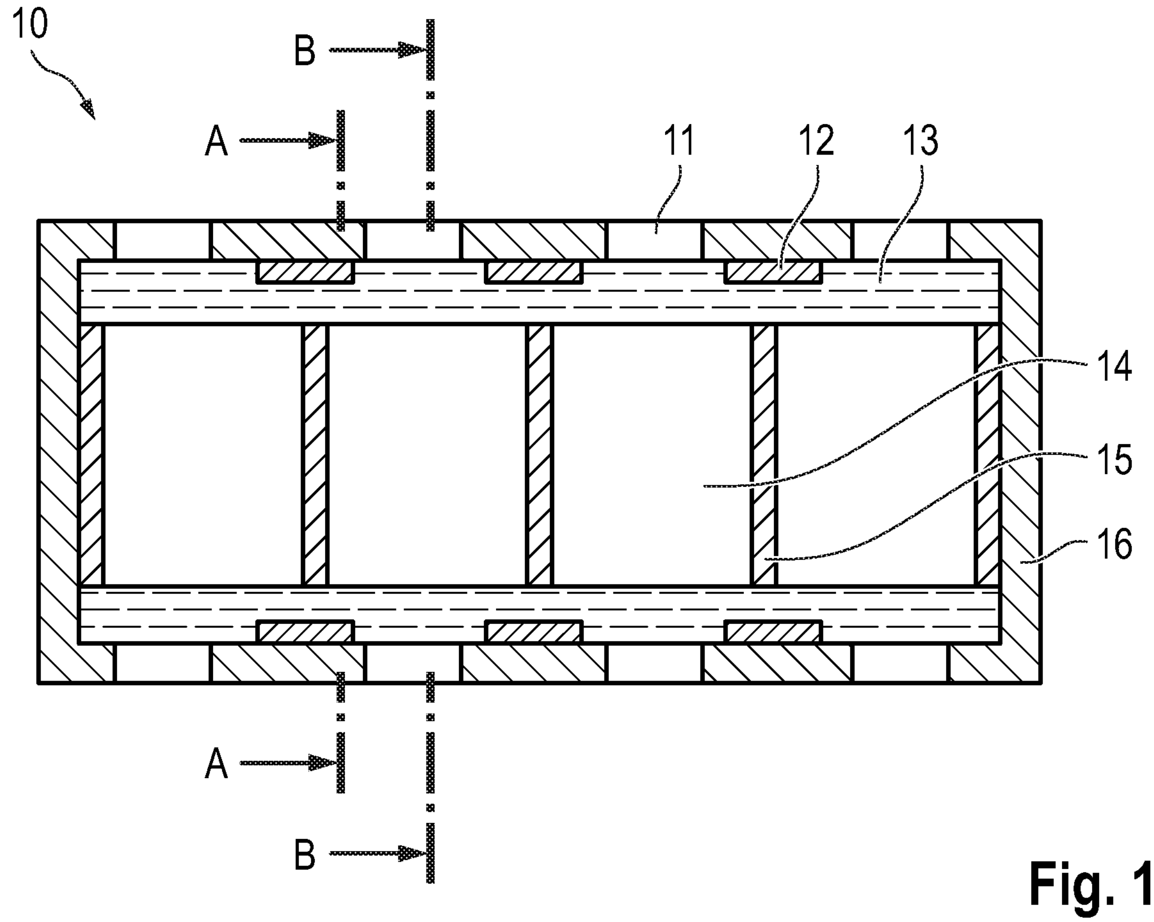
FIG. 1 shows the cross-section of a module in its normal state.

FIG. 1 illustrates the normal state of a module (10) in the propulsion battery of a motor vehicle. The housing (16) of the module (10) is traversed, horizontally according to the illustration, by a network of coolant-conducting passages (13), between which a stack of four cuboid-shaped lithium ion cells (14) is arranged, being separated from one another only by compression pads (15) and being separated from the housing (16).

In a bilateral extension of each compression pad (15), perpendicularly according to the illustration, two sealing bodies (12) are arranged in the passages (13) extending along the cells (14), such that two adjacent sealing bodies (12) in each passage (13) delimit a section that extends across the width of a cell (14) according to the illustration and encloses a degassing opening (11) provided centrally in the housing (16). Each cell (14) of the stack is thus fluidly connected to the degassing opening (11) that opens on the corresponding side out of the housing (16) via the adjacent section of the passage (13) extending above and below it according to the illustration.

Figure 2:
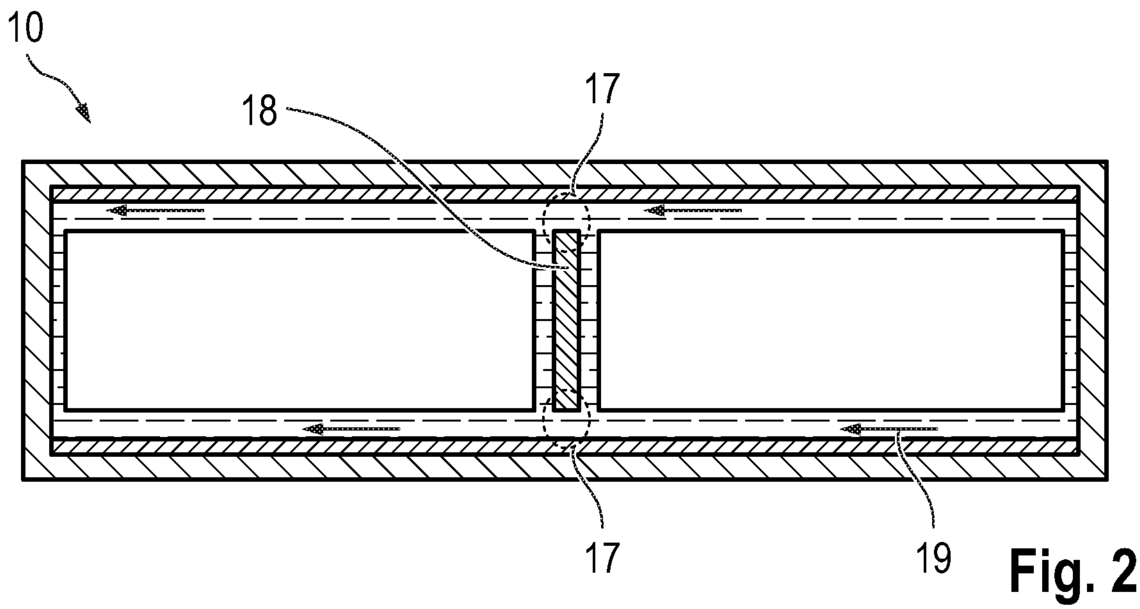
FIG. 2 shows a longitudinal section of the module in the normal state in plane A-A according to FIG. 1.

The sectional view of FIG. 2 shows two such cell stacks, between which a wall (18) of the housing (16) extends centrally, being perpendicular according to the illustration. On the front side of this wall (18), and thus centrally on the respective sealing body, the bilateral coolant passages indicate a constriction (17), along which the body extends, horizontally according to the illustration, over the entire expanse of the module (10).

Figure 3:
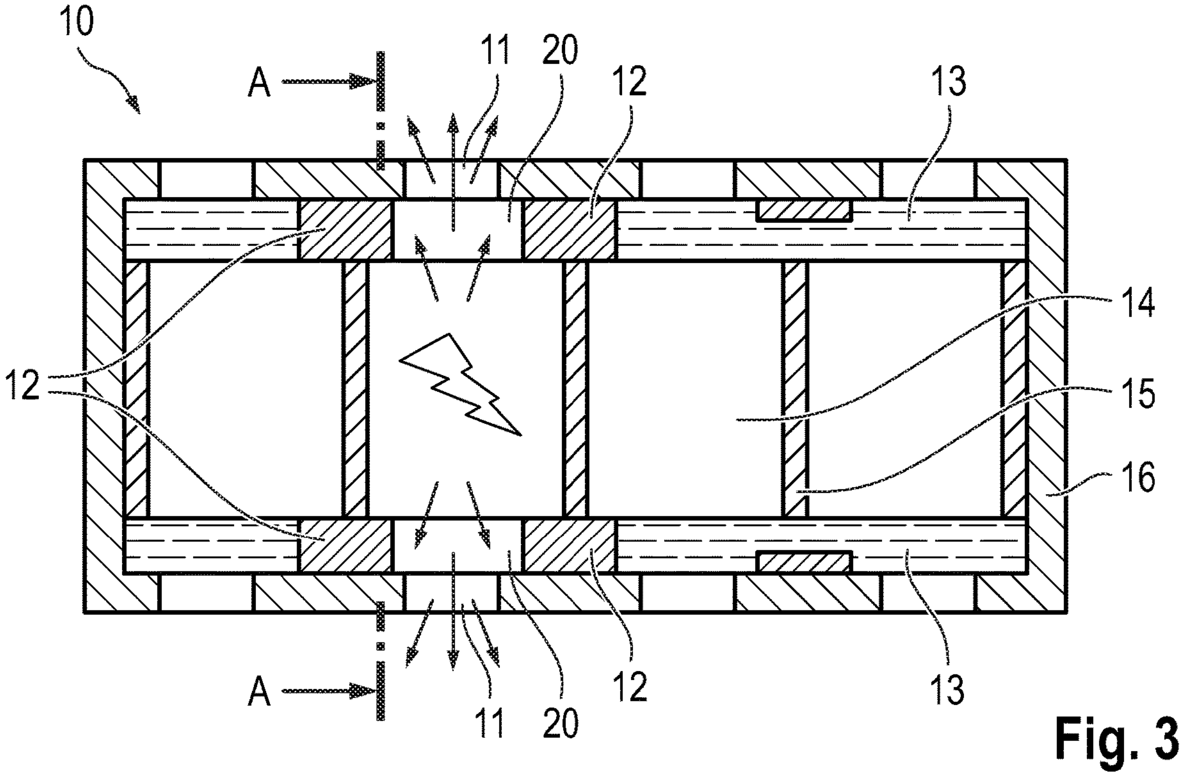
FIG. 3 shows a cross-section of the module corresponding to FIG. 1 upon ignition of a cell.

FIG. 3 illuminates the functionality of this arrangement in the event that a flame region forms from the left within the second battery cell according to the illustration. The heat emanating from the latter causes a sufficient expansion of the adjacent sealing bodies (12) such that they locally close the respective passages (13) and thus, in pairs, partition off the section (20) of the respective passage (13) extending between them, so that the coolant does not flow downstream into the flame region and is separated from its hot gases. In turn, the coolant and hot gas from the flame region escape via the partitioned sections (20) through the degassing openings (11) of the housing above and below according to the illustration, without being able to heat other battery cells.

Figure 4:
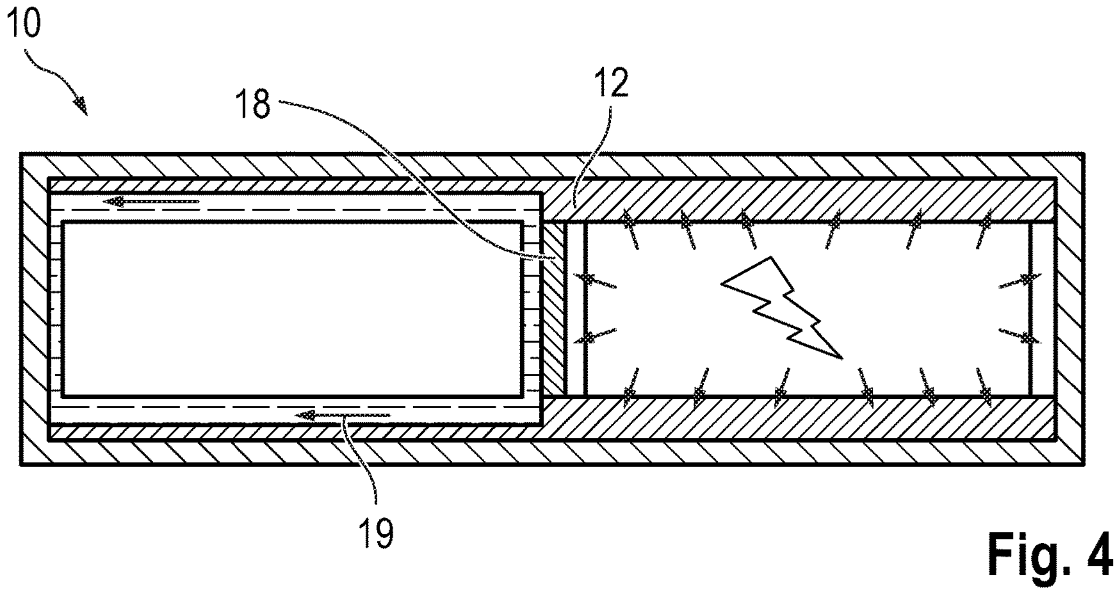
FIG. 4 shows a longitudinal section of the module corresponding to FIG. 2 upon ignition of a cell.
Figure 5:
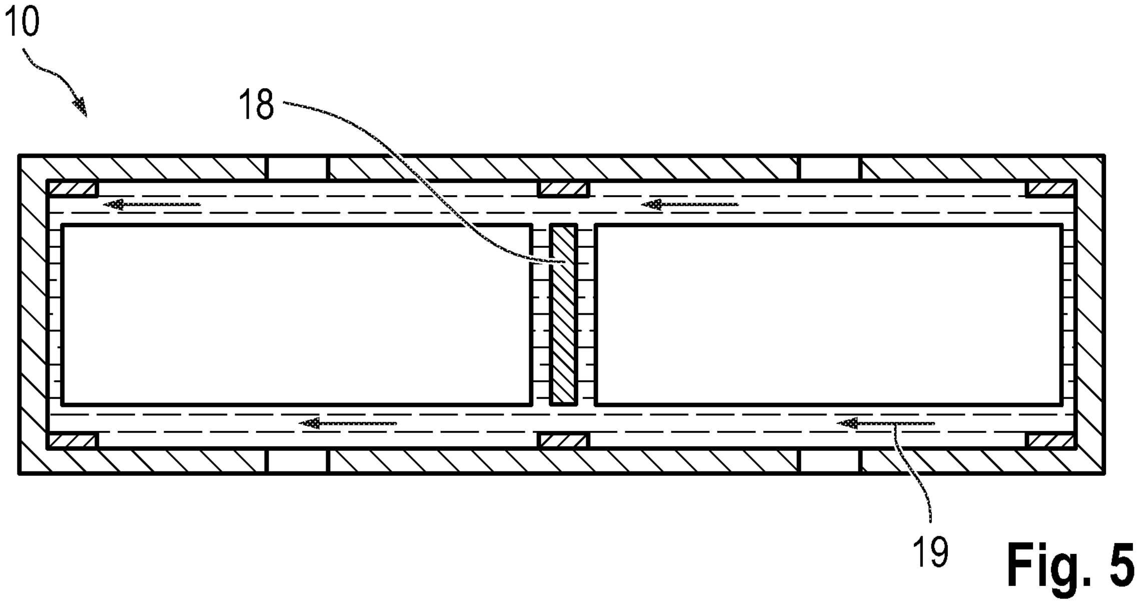
FIG. 5 shows a longitudinal section of the module in the normal state in plane B-B according to FIG. 1.
Figure 6:
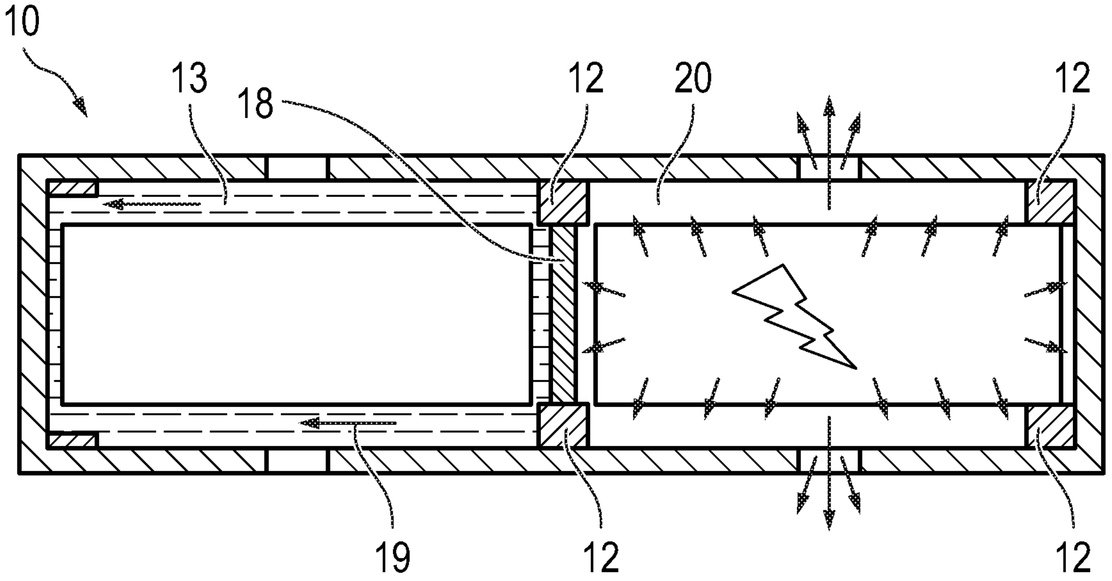
FIG. 6 shows a longitudinal section of the module corresponding to FIG. 5 upon ignition of a cell.

However, as an overall view of FIGS. 4 to 6 illustrates, the flow (19) of the coolant beyond the sealing bodies (12) adjacent to the flame region and the wall (18) extending between them does not run away, such that the cooling of the battery cells of the stack on the left according to the illustration, as well as any other modules, continues irrespective of the expansion of the sealing bodies (12). The material of which these are made can be chosen so as to achieve the described expansion, for example on the basis of its intumescence, strong thermal expansion, or pronounced swelling tendency.

What is claimed is:

1. A module for a battery, said module comprising:

a housing traversed by passages for coolant, said housing having (i) exterior walls defining an interior space and (ii) an interior wall positioned within the interior space, battery cells arranged within the interior space, on opposite sides of the interior wall, and between the passages, and sealing bodies arranged in the passages, said sealing bodies configured to expand upon heating, at least partially close the passages and form a boundary around one of the battery cells, wherein each sealing body is arranged at a location that aligns with the interior wall, and wherein upon expansion, each sealing body extends from one of the exterior walls to the interior wall to close one of the passages.

2. The module according to claim 1, wherein the passages have constrictions, and the sealing bodies are arranged at the constrictions.

3. The module according to claim 2, wherein the battery cells are arranged in stacks, wherein the interior wall extends between the stacks, and the constrictions are located adjacent the interior wall.

4. A battery comprising a plurality of the modules according to claim 2, wherein the passages fluidly connect the modules to one another, and the constrictions are located between the modules.

5. A motor vehicle having a battery according to claim 4.

6. The module according to claim 3, wherein the sealing bodies are arranged such that a pair of the sealing bodies divides the passages into sections extending along the battery cells, and the housing comprises degassing openings fluidly connected to the sections.

7. The module according to claim 6, wherein the module comprises compression pads arranged between the battery cells, the compression pads being arranged parallel to one another and offset from the degassing openings, and the sealing bodies being arranged so as to bilaterally extend toward the compression pads in an expanded state of the sealing bodies.

8. The module according to claim 6, wherein the sealing bodies extend transversely to the interior wall and longitudinally to a flow of the coolant, and the passages are connected in a network such that, when one of the sections is closed, the flow does not run beyond the adjacent sealing bodies.

9. Use of the module according to claim 8, wherein as soon as a flame region forms within the battery cells, the adjacent sealing bodies expand due to the heat emanating from the flame region, wherein the expanding sealing bodies, in pairs, partition off the sections extending between the sealing body against the flow of the coolant such that the coolant does not flow downstream into the flame region, and wherein the coolant and gas escape from the flame region via the partitioned sections through the degassing openings connected thereto.

10. The module according to claim 1, wherein each sealing body comprises an intumescent material that swells upon heating, wherein each sealing body comprises either (i) a material with a sufficiently high coefficient of thermal expansion so as to thermally expand upon heating, or (ii) a material that is prone to endothermic swelling, such that, upon heating, the coolant or gas swells up the sealing body.

11. The module according to claim 6, wherein one section of said sections is bounded by one of the battery cells, one of the degassing openings, and the pair of sealing bodies.

12. The module according to claim 6, wherein a first degassing opening of said degassing openings registers with a first battery cell of said battery cells, and a second degassing opening of said degassing openings registers with a second battery cell of said battery cells.

13. The module according to claim 12, wherein the first and second degassing cells are spaced apart along a length of one of the exterior walls of the housing.

14. The module according to claim 6, wherein one of the degassing openings is arranged between the pair of sealing bodies as viewed along a lengthwise direction of the module.

15. The module according to claim 1, wherein in an expanded state of one of the sealing bodies, the expanded sealing body bears directly on two adjacent battery cells of the battery cells.

16. The module according to claim 15, wherein in an expanded state of one of the sealing bodies, the expanded sealing body bears directly on the interior wall.

17. The module according to claim 6, wherein the degassing openings are aligned with the battery cells along a length of the module.

18. The module according to claim 6, wherein a first degassing opening is arranged on a top exterior wall of the housing and positioned above one of the battery cells, and a second degassing opening is arranged on a bottom exterior wall of the housing and positioned below said one of the battery cells.

19. The module according to claim 7, wherein each compression pad is aligned with a respective one of the sealing bodies along a length dimension of the module.

* * * * *